Dec. 20, 1955 W. J. SACKETT 2,727,669
WEIGHED QUANTITY BAGGER
Filed Sept. 15, 1950 8 Sheets-Sheet 3

INVENTOR.
Walter J. Sackett,
BY
Thomas W. J. Clark
Attorney

Dec. 20, 1955   W. J. SACKETT   2,727,669
WEIGHED QUANTITY BAGGER
Filed Sept. 15, 1950   8 Sheets-Sheet 6

FIG.11.

INVENTOR.
Walter J. Sackett
By Thomas W. Clark
Attorney

Dec. 20, 1955 W. J. SACKETT 2,727,669
WEIGHED QUANTITY BAGGER
Filed Sept. 15, 1950 8 Sheets-Sheet 7

INVENTOR.
Walter J. Sackett.
BY
Thomas W. Y. Clark
Attorney

Dec. 20, 1955     W. J. SACKETT     2,727,669
WEIGHED QUANTITY BAGGER
Filed Sept. 15, 1950     8 Sheets-Sheet 8

INVENTOR.
Walter J. Sackett,
BY
Thomas W. J. Clark
Attorney

United States Patent Office 2,727,669
Patented Dec. 20, 1955

2,727,669

WEIGHED QUANTITY BAGGER

Walter J. Sackett, Baltimore, Md.

Application September 15, 1950, Serial No. 185,057

24 Claims. (Cl. 226—61)

This invention relates to an automatic weighed quantity bag filling apparatus, particularly adapted to the bagging of a predetermined quantity of fertilizer material. Such materials differ widely from dry free flowing materials, such as granulated sugar, and the various grains, in that they are strongly inclined to clog and bridge so that they cannot be fed freely by pouring and when accumulated as in a hopper they become lodged and cannot ordinarily be moved without human intervention.

The prior art machines which perform the bag filling operation with a predetermined quantity of materials transfer material to a valve-controlled hopper where material has a tendency to accumulate at the end of a weighing operation. If this happens it tends to bridge and clog, interfering with each successive weighing operation and requiring special attention in each instance.

The object of the present invention is to provide a weighed quantity bag filling device which is fed continuously with material, and wherein the material is to flow continuously, a valve merely diverting material from one bag to another successively so that there is practically no accumulation of material in a valve controlled hopper or the like. This machine accomplishes more accurate weighing of fertilizer than can be done by hand in the time allowed for this operation and avoids delay due to the matting and bridging of the accumulated quantities being handled. The weighing is on the basis of a dynamic uniform flow for a certain period, rather than a static weighing principle, and continuous rather than intermittent flow.

The machine of the invention comprises a continuously operating automatic uniform feeding device, the flow of material from which is diverted to a plurality of bag mouth funnels sequentially, without allowing any material to accumulate in the bag funnels. The operation of the flow diverting means is so timed that the material which flows into a given funnel exactly fills the bag associated to the desired amount. The flow diverting means then shifts flow to another funnel, the previously filled bag preferably being automatically released, transferred to a conveyor and carried to the next operating point. Thus no material accumulates in the bag mouth funnels. Preferably the material is fed directly from the uniform feed into the successive bags in a substantially continuous movement of material.

There has been disclosed a preferred form and modified form of the apparatus both of which forms respond to the foregoing outline, the essentials of the machine being different mainly as to the number of bags being filled from a single uniform feed device.

In both forms of apparatus, the material is fed continuously from the uniform feed conveyor into successive bags without any accumulation of material in the bag mouth funnels or elsewhere in the bag filling system.

The above and other objects of the invention will be apparent from the following description and the accompanying drawings forming a part thereof, and in which:

Referring to the drawings by numerals, each of which is used to indicate the same or similar parts in the different figures, Figures 1 to 10 being first described on account of the greater detail of the uniform feed device and control circuits shown in connection therewith.

Figure 1:
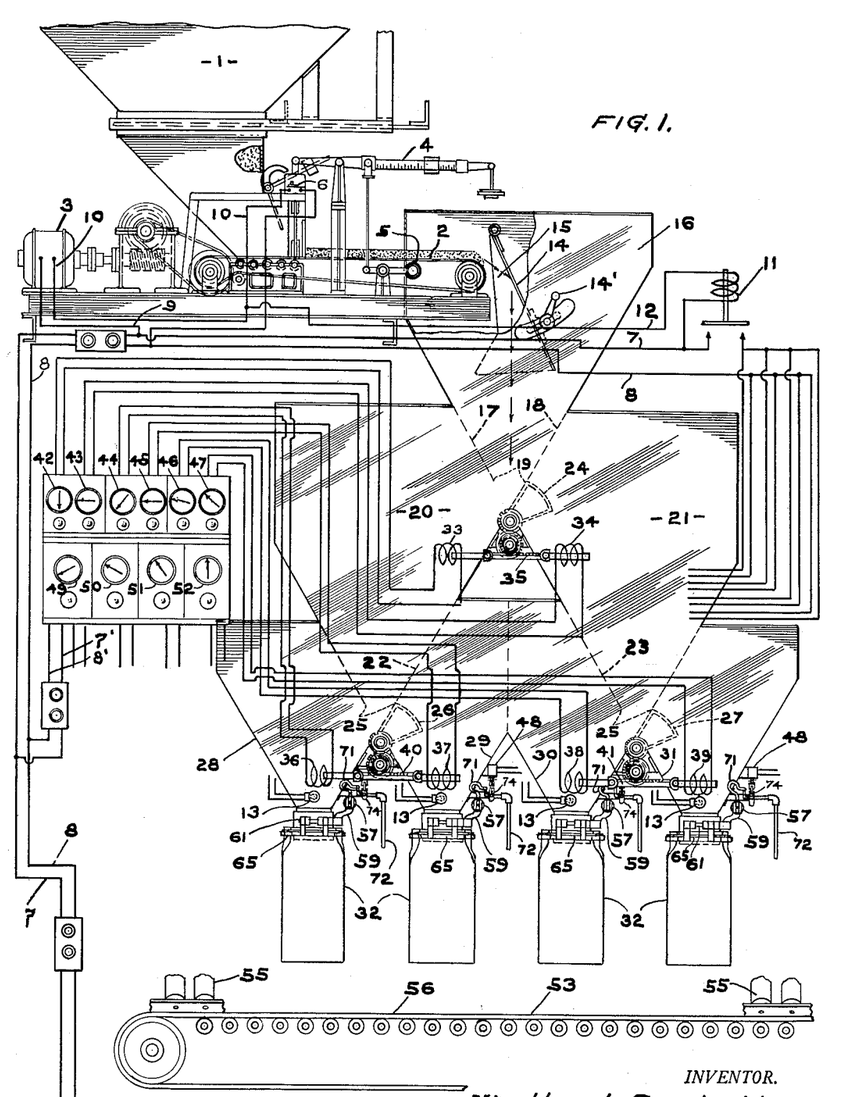
Figure 1 is a diagrammatic elevation of a representative apparatus including four bag mouth funnels.

The construction as shown comprises a bin 1 delivering material to a continuous weighing conveyor 2 which may be adjusted to operate at any desired uniform delivery rate. The function of the device in this invention is merely to deliver a uniform weight of material per unit of time. The conveyor is driven by an electric motor 3 through suitable reduction gears and pulleys, and feed is kept uniform by means of lever arm 4 actuated by roller 5 which is responsive to the weight of material on the conveyor. A mechanism responsive to the flow of material being fed to the conveyor controls a switch 6 which is, as a result, closed during normal supply of material to the conveyor and is opened when insufficient material is being supplied to the conveyor.

The motor 3 is supplied with power from conductors 7 and 8, branch conductor 9 leading directly from conductor 7 to the motor and conductor 10 connecting with the motor through the normally closed switch 6 from conductor 8. Thus when switch 6 is opened due to an insufficient supply of material to the hopper to feed to the continuous weighing conveyor 2, the motor 3 is stopped because of the open circuit in conductor 10. It will be observed that conductor 7 leads also to the relay 11, the electric circuit being closed through conductor 12, conductor 10, switch 6 and supply conductor 8. Thus relay 11 is operated while the motor 3 is running and opens when the motor is stopped. A plurality of signal lamps 13 are connected through relay 11 to the supply conductors 7 and 8. Thus when switch 6 opens stopping motor 3 and conveyor 2, the relay 11 releases closing its contacts to light lamps 13 as a signal that material is no longer being supplied to the system.

As the material leaves the conveyor it preferably strikes a guide 14 which is adjustably mounted by means of clamp 14' to compensate for varying delivery speeds of the conveyor 2. This guide preferably has a plurality of breakers 15 projecting outwardly to insure a uniform distribution of material striking the guide and flowing down therefrom. The receiving chute 16 containing the guide 14 has sloping converging walls 17 and 18 providing an opening 19 through which material flows from the guide. Left and right distributing chutes 20 and 21 have walls 22 and 23 sloping toward the opening 19 and an oscillating valve 24 is mounted beneath opening 19 at the convergence of walls 22 and 23. This valve is adapted to divert the flow of material from guide 14 alternately to chutes 20 and 21.

Similarly disposed beneath openings 25 of chutes 20 and 21 are lower oscillating valves 26 and 27 controlling flow to bag mouth funnels 28, 29, and 30, 31. Clamped beneath the funnels are bags 32 which are to be filled with a weighed quantity of material such as fertilizer. Solenoids 33 and 34 control valve 24 by means of rack 35, valves 26 and 27 are controlled by means of solenoids 36, 37 and 38, 39 acting on left and right racks 40 and 41.

Timers 42, 43, 44, 45, 46, 47 powered from supply conductors 7' and 8' control solenoids 33, 34, 36, 37, 38, 39 respectively. For filling the bags 32 each with 100 pounds of material, with a flow of substantially 13½ pounds per second from the conveyor 2, for example, the timing would be as follows: Supposing that uniform flow has already been established, with the valves as shown in Figure 1. After material has flowed into bag mouth funnel 28 for seven and one-half seconds, the timers 42 and 46 actuate solenoids 33 and 38 to shift valves 24 and 27 to left position to feed into funnel 31. Seven and one-half second later timer 47 actuates solenoid 39 to shift lower valve 27 to its right position to direct material into funnel 30 for seven and one-half seconds. Solenoids 34 and 36 are then actuated by timers 43 and 44 for flow to funnel 29. Solenoid 37 would then be actuated to begin flow to funnel 28.

To accomplish this sequence each timer could merely be set to actuate its solenoid every 30 seconds and put in operation one funnel each seven and one-half seconds in the sequence described.

In starting, due to the non-uniform supply of the continuous weigher at this time, bags would not be properly filled and the contents could be returned to the delivery bin 1. In stopping, material is always completely removed from the chutes and funnels into the bags, before the valves cease oscillating. The conveyor 2 stops automatically but the timers are cut off manually by means of switches when all material in the funnels has been collected.

Figure 8:
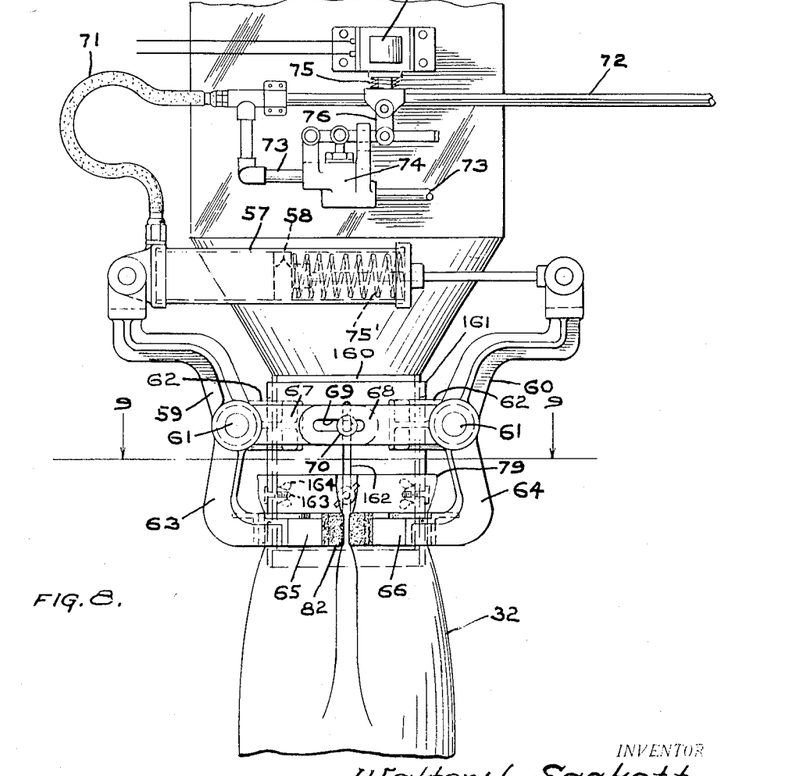
Figure 8 is a partial side elevation of a bag holder.
Figure 10:
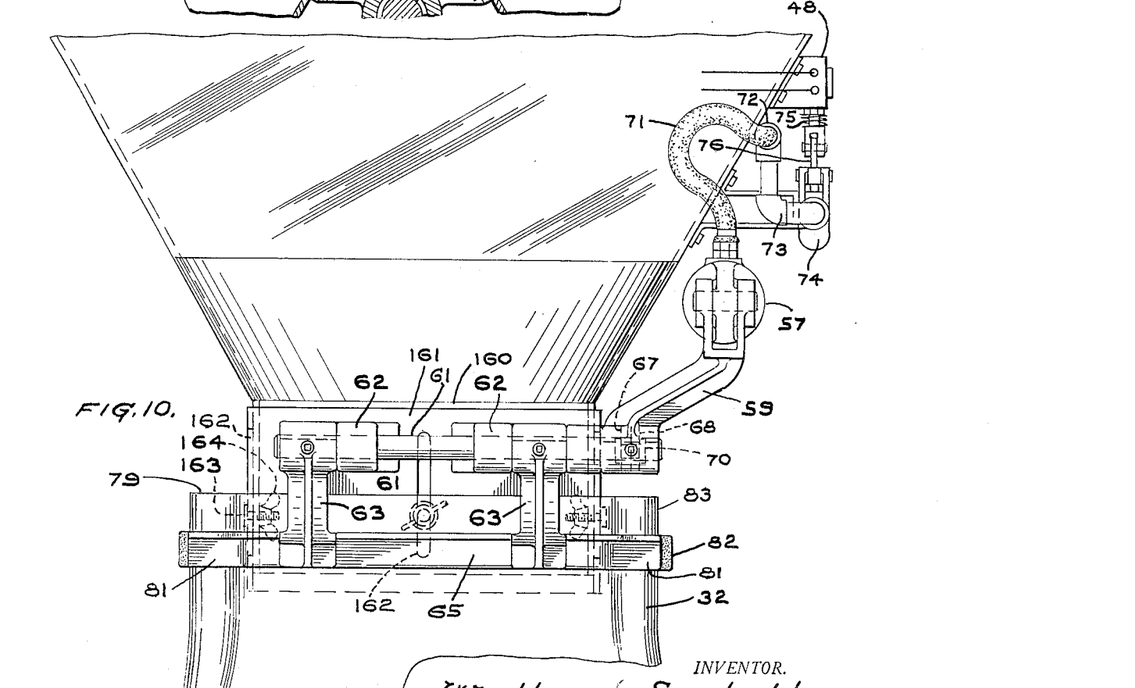
Figure 10 is an enlarged partial front elevation of the bag holding means.

Synchronized with the valves are the bag release solenoids 48 two of which are represented diagrammatically in Figure 1, and in detail in Figures 8 and 10. The timers 49, 50, 51, 52, powered from supply conductors 7', 8', are associated with the solenoids 48 controlling the bag holders of funnels 28, 29, 30, 31, respectively. The timers may be set to actuate their solenoids just after the associated bag is filled, and thus each would operate approximately every 30 seconds, with a time delay between operations of substantially 22½ seconds to dispose of the filled bag, and attach an empty bag in its place. For example, in the sequence of operation described, timer 49 would actuate its solenoid sufficiently long to effect release of a bag on funnel 28 somewhat after every actuation of solenoid 33. This delay is interposed between the shifting of valve 24 and the release of the bag in order to allow all the material in chute 20 and funnel 28 to flow into the bag prior to the release of the bag, so that no accumulation in the chute or funnel, or spilling will occur. The synchronization of the valves and bag release mechanisms can be accomplished by any suitable means in conjunction with the common power supply through conductors 7' and 8' which supply power to all the timers.

Figure 2:
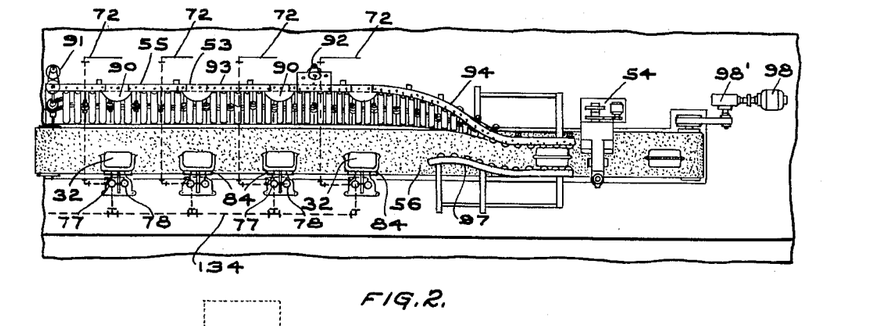
Figure 2 is a partial plan view of the conveyor and the deflectors below the bag mouth funnels.
Figure 3:
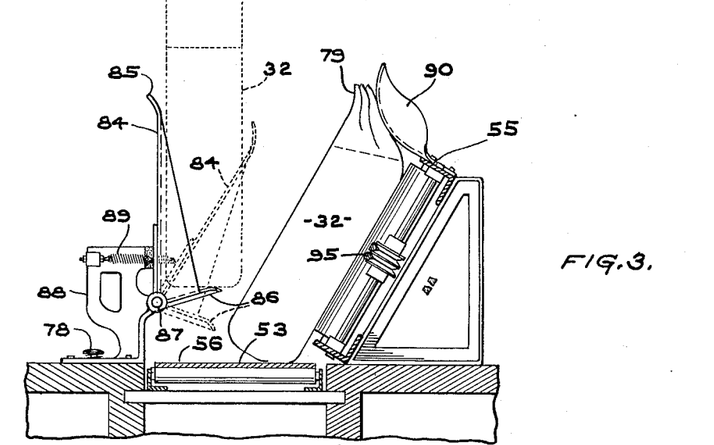
Figure 3 is an enlarged cross-sectional view illustrating the bag deflector and conveyor.

During the operation of the machine as set forth above empty bags are to be substituted manually for the filled bags which are automatically released. A conveyor 53 is disposed to receive the filled bags when released and conduct them to a bag top closing machine 54, Figure 2. The bags are in the line of movement of the conveyor so that if the left bag were simply dropped to a conveyor it would collide with another of the bags clamped to the funnels and still unfilled. The conveyor is especially constructed to overcome this difficulty. Specifically an inclined roller conveyor 55 is disposed opposite the funnels so that a bag leaning thereon and supported on the horizontal belt conveyor 56 clears the bags mounted on the funnels, as can be seen in Figure 3. The inclined conveyor 55 gradually assumes a vertical position after the funnels are passed, and the bag top may be prepared as shown in Figure 2 to the left of machine 54 for stitching the top closed. A bag with top stitched closed is shown to the right of the stitching machine.

Figure 9:
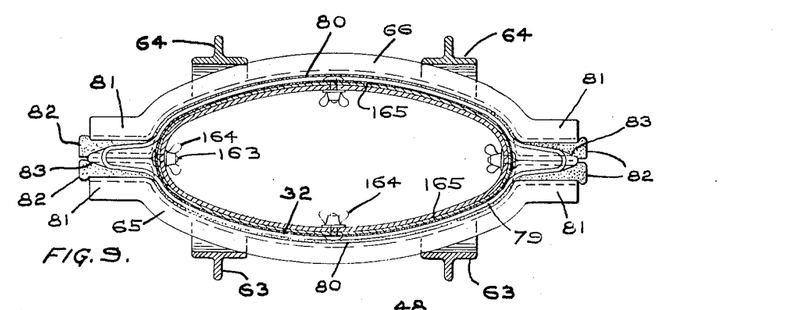
Figure 9 is a horizontal sectional view taken along the lines 9—9 of Figure 8.

The detailed construction of the bag holding means is best seen in Figures 8, 9 and 10 and includes a pneumatic cylinder 57 and a spring urged piston 58 carried by arms 59 and 60. These arms are fixed to shafts 61 rotatably mounted in brackets 62, Figure 10. Pairs of legs 63 and 64 are secured to shafts 61 and carry at their lower ends curved bag clamping members 65 and 66 to provide clamping jaws. Arm extensions 67 and 68 are integral with the arms 59 and 60, respectively at one end and overlap each other at the other end, extensions 68 having a slot 69 in which bolt 70 of extension 67 slides to insure equal opening of the jaws. Air is supplied to and exhausted from cylinder 57 by means of flexible hose 71 connecting with the air supply pipe 72 and exhaust pipe 73. Controlling relief valve 74 in exhaust pipe 73 is a bag release solenoid 48 which is connected with one of the timers 49, 50, 51, 52. The relief valve is normally closed and is opened by retraction of the armature into solenoid 48 against the action of spring 75, which retraction actuates linkage 76 to open the valve. The timer actuates the solenoid only long enough to exhaust air from cylinder 57 and then releases, the relief valve 74 again closing. When the relief valve 74 is open, spring 75' acts to urge the piston 58 to the left to force air out through hose 71 and the relief valve. The supply pipe 72 is preferably controlled by an inlet and an exhaust valve adjacent the operator's feet, independently of relief valve 74. These valves are operated by foot pedals 77 and 78, Figures 2 and 3. Depressing foot pedal 77 opens the supply line valve to admit air to cylinder 57, moving piston 58 to the right, spreading arms 59 and 60 to rock the respective shafts 61 counter-clockwise and clockwise as seen in Figure 8, forcing the legs 63 and 64 inwardly to press the clamping members 65 and 66 against the upper portion 79 of the bag 32.

The extensions 67 and 68 insure that legs 63 and 64 will open equally since arms 59 and 60 must rotate together due to the pin and slot connection 69, 70. So that empty bags may be most easily placed in clamping position, foot pedal 78 operates an exahust valve independent of relief valve 74, and the operator may thus release and reclamp the bag as may be necessary if the bag is not properly placed initially. When pedal 78 is operated, air is exhausted from cylinder 57 under action of spring 75' through supply line 72 rather than through the exhaust pipe 73 as in automatic operation. Thus the operator has independent parallel control of the bag holding means. It will be observed that the cylinder is not attached to the bag mouth funnel and is supported through arms 59 and 60 on the brackets 62. The purpose of this arrangement will be described hereinafter in connection with Figure 16.

Referring to Figures 8 and 9, it will be seen that the clamping members 65, 66 have a rubber inner face coating 80 where the pressure is applied to the bag top portion 79 and that at the parallel end portions 81 of the clamping members are carried soft rubber facings 82 which grip and close the bag free edges 83, not gripped by the clamping members. These features add to the gripping power of the bag holder and prevent dust escaping from the bag. The bag is opened sufficiently so that air may be displaced upwardly into the funnel as material is fed in, and at the same time the bag will amply fit onto the bag holder for ease of manual replacement of bags. It will be noted that the bag mouth distending funnels are of generally elliptical cross-section, the long axis extending in the direction of movement of the conveyor for easier clearance of filled bags thereon.

The means for moving the filled bags from the bag mouth funnels to the conveyors 53 is shown in Figure 3 and comprises a bag deflecting bracket 84 having an upstanding back member 85 with a flange 86 extending at an acute angle to the back member. The bracket 84 is pivotally mounted at 87 on support 88 adjacent the horizontal conveyor 56.

A spring 89 holds the deflector bracket 84 cocked in bag receiving position and allows pivotal movement of the bracket under the impact of a filled bag on the flange 86 into the position of the bracket shown in dotted outline in Figure 3 to discharge a bag against the inclined roller conveyor 55, the spring then returning bracket 84 to upright bag receiving position. The inclined flange 86 causes the weight of the bag to be applied at the outer end of the flange for more positive rotation and positive discharge of the bag from the flange. The contacting of the bag by the flange at only one point reduces friction and promotes deflection of the bag rather than simple rotation of the bag about its bottom. The quick action of the deflector due to the greater torque set up by virtue of the inclined flange and fairly sudden slowing at the end of the travel makes for deflection tangential to the path of rotation of the bag. The acute angle also makes for a longer follow-up of back member 85. Note that foot pedals 77 and 78 are mounted in the horizontal flange portion of bracket 88 and are thus somewhat protected against accidental operation as well as being conveniently located for normal operation. A bag top closing shield 90 extends from the top of the inclined conveyor 55 and contacts the top 79 of the bag prior to impact of the bag against the conveyor to close the top and prevent material from escaping due to the impact.

As shown in Figure 2, two independent drives 91, 92 are provided for the feed and discharge portions 93, 94 of the inclined conveyor 55. The drive 91 for the straight part 93 of the conveyor 55 includes two V-belts 95 and for the curved part 94 includes V-belts 96. A dummy roller conveyor portion 97 extends along the side of horizontal conveyor 56 opposite to curved portion 94 and is designed to cooperate therewith in uprighting the bags and preparing them for delivery to the stitching machine 54. A single variable speed motor 98 operates the horizontal conveyor 56 through reduction gearing 98'.

Figure 4:
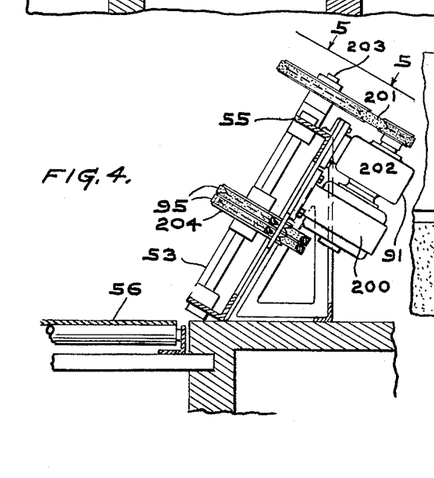
Figure 4 is a partial cross-sectional view taken along the line 4—4 of Figure 5 showing the drive for the straight part of the inclined conveyor.
Figure 5:
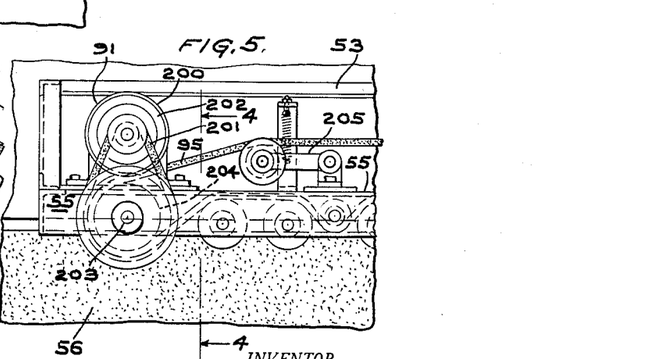
Figure 5 is a partial plan view looking in the direction indicated by the line 5—5 of Figure 4.

Referring to Figures 4 and 5, the drive for the straight part 93 of the inclined conveyor comprises a variable speed motor 200 driving a belt 201 through reduction gearing 202. The belt 201 drives a shaft 203 on which are fixed the drive pulleys 204 for the V-belts 95. The tension of the V-belts is adjusted by means of a screw adjusted mechanism 205.

The drive for the curved part 94 of the inclined conveyor comprises a variable speed motor 206 driving pulley 207 through reduction gearing 208. A belt 209 serves to drive shaft 210 by means of pulley 211. Pulley pair 212 on shaft 210 in turn drives shaft 213 by V-belts 214 turning pulley pair 215. Pulleys 216 are driven by the shaft 213 and carry V-belts 217 turning pulleys 218 on shaft 219. The shaft 219 has pulley 220 thereon by which the conveyor V-belts 96 are driven. Pulleys 221 idle on shaft 219 and receive V-belts 95 for the straight part 93 of the inclined conveyor.

Figure 6:
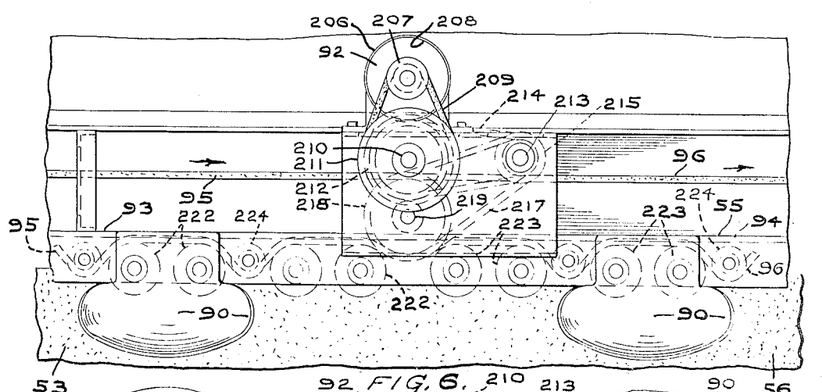
Figure 6 is a partial plan view taken in the direction of incline of the inclined conveyor.
Figure 7:
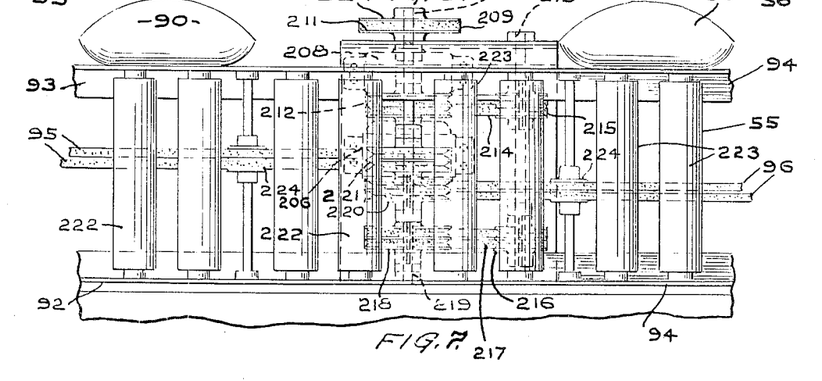
Figure 7 is a partial front elevational view taken perpendicular to the surface of the inclined conveyor.

It will be noted that the spacing between rollers 222 of the straight part 93 and rollers 223 of the curved part 94 is the same as spacing between rollers 222 or 223 adjacent take up pulleys 224 so that no discontinuity of the inclined conveyor is occasioned by the separate independent drives.

The speeds of the conveyors are to be the same and are adjusted so that the filled bags do not interfere with one another.

It is to be understood that different size bags can be filled on the machine by adjusting the timers. For example, to fill one hundred pound bags on funnels 28 and 29 and two hundred pound bags on funnels 30 and 31, solenoids 33 and 38 are actuated after seven and one-half seconds, solenoid 39 is actuated after fifteen seconds and solenoids 34 and 36, fifteen seconds later. Solenoid 37 then operates seven and one-half seconds thereafter. Thus, each solenoid is actuated every 45 seconds, once operation is initiated in the proper sequence.

Figure 11:
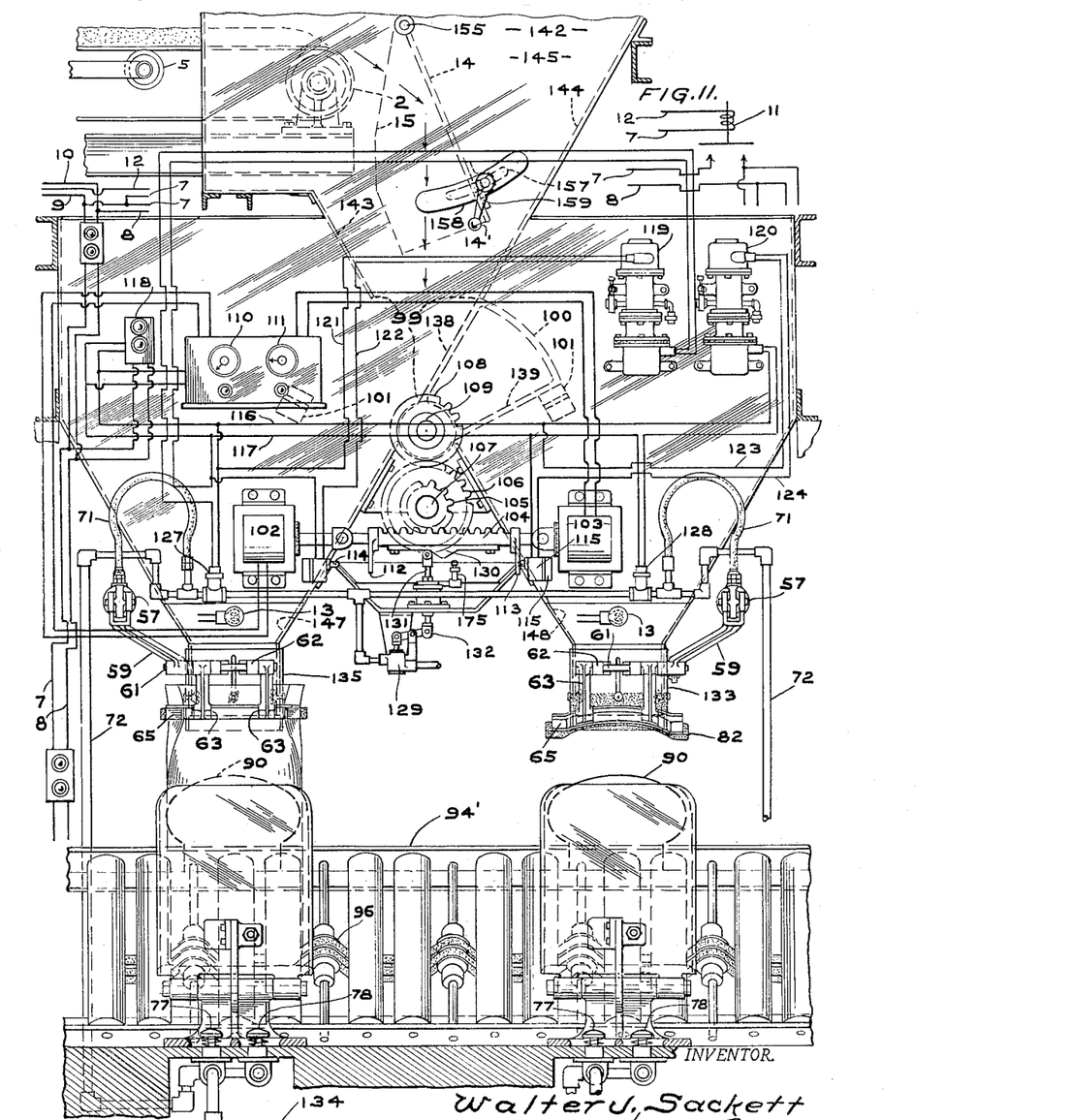
Figure 11 is a partial diagrammatic elevational view of the preferred embodiment of the invention.

Figure 11 represents the preferred embodiment of the invention. Material is again represented to be delivered by a continuous weighing conveyor 2 with the same electrical connections for stopping the conveyor and lighting lamps 13 as a signal to the operator feeding bags onto the bag holders. Thus conductor 9 leads to the motor from supply conductor 7 and conductor 10 returns through the scale switch contacts to supply conductor 8 and conductors 7 and 12 connect relay 11 to the supply through the scale switch. When the scale switch controlled by the flow of material is opened, relay 11 releases to close its contacts and light lamp 13. The guide 14 is again adjustable by means of clamp 14'. It will be noted that the angle between the direction of flow of material against the guide and the surface of the guide is acute so that the tendency of the flow of the material is to maintain a glancing impact upon the guide and thus avoid sticking. It is possible to adjust the guide to various angles as may be necessary to avoid sticking and at the same time compensate for varying delivery rates of material. That is, the guide may be so disposed in relation to the conveyor in its mounting that for the range of delivery rates to be employed, the adjustment of the guide to the proper angle for delivery of material through the opening 99 to the oscillating valve 100 will result in such an angle being presented to the flow of material that the flow is merely deflected, the component of velocity normal to the guide surface being sufficiently small that the possibility of sticking or bridging is avoided.

The operation of this embodiment is similar to that of Figure 1. Valve 100 is oscillated between stops 101 by means of solenoids 102 and 103, acting on rack 104. The rack acts through gears 105 and 106 on shaft 107 and gear 108 on shaft 109 to rock shaft 109 on which the valve 100 is fixedly mounted, Figures 12 and 13. The oscillating valves are identical in both embodiments and will be described in detail hereinafter. The solenoids are alternately actuated by means of timers 110 and 111. For the rate of flow previously described, to fill 100 pound bags, each timer would actuate its solenoid every fifteen seconds.

The means for coordinating the bag release with the valve movements differs from that for the other embodiment described. Abutment members 112 and 113 are carried at opposite ends of the rack 104 and are adapted to engage valve switches 114 and 115 respectively. These valve switches are normally open and close upon engagement with the associated abutment member. Supply branches 116 and 117 which connect through switch 118 with supply conductors 7 and 8 are then connected through the valve switch 114 or 115 with delayed action relay 119 or 120 by means of conductors 121, 122 or 123, 124. These delayed action relays close contacts 125, 126, Figure 18, to connect solenoid valves 127 and 128 across the branches 116 and 117 to move the air valves to open position.

With the valve 100 in the position shown in Figure 11, abutment member 113 is in contact with valve switch 115 to actuate delayed action relay 120 and open solenoid air valve 128. Air valve 127 is closed. The common relief valve 129 is normally closed and is moved to open position by cam surface 130 carried by rack 104 acting on the follower mechanism 131 to actuate linkage 132. Since the common relief valve 129 and air valve 127 are closed, a new bag may be clamped in place on the right bag mouth funnel 133 by means of cylinder 57, and the clamping means which are identical to those shown in Figure 8. As previously, air supply lines 72 are connected through inlet valves controlled by foot pedals 77 to a main supply 134 and foot pedals 78 control independent exhaust valves. Thus by placing a bag in position to be clamped on funnel 133 and depressing left foot pedal 77, the air pressure from the main supply 134 will act through supply line 72 to expand in cylinder 57 and actuate the right holding means. If the bag is not properly clamped, foot pedal 78 is pressed to exhaust cylinder 57 through line 72 to release the bag and readjust it. The left bag is not released since valve 127 is closed.

If now the solenoid 102 is actuated by timer 110, rack 104 moves to the left, immediately releasing switch 115 and closing air valve 128. The cam surface 130 then depresses the follower mechanism 131 to open the relief valve 129. This valve delays closing as will hereinafter be described until after abutment member 112 has closed switch 114 and the delayed action relay 119 has operated to open air valve 127 and release the filled bag on funnel 135. The common relief valve 129 then closes and another bag can be mounted on funnel 135. The delayed action relay thus delays release of the bag until somewhat after the shifting of the valve 100 as in the previous embodiment in order to allow time for the material left in the funnel to flow into the bag.

The conveyor shown in Figure 11 may be similar to the inclined conveyor 94 in Figure 2, except that the inclined conveyor 94' is driven by a single motor, since it is considerably shorter than the conveyor of Figure 2.

Figure 12:
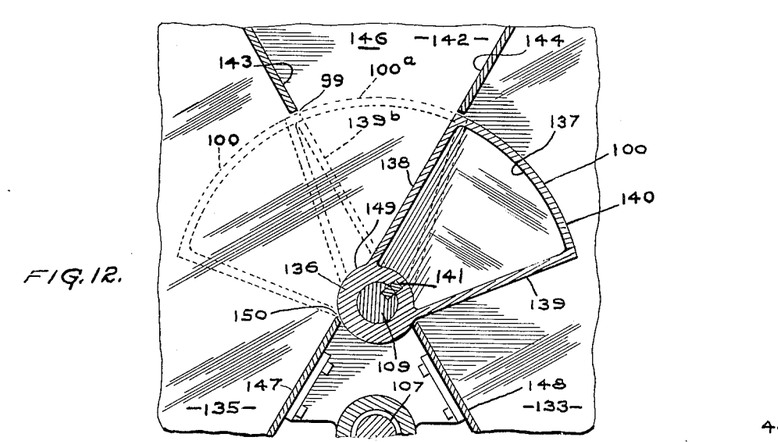
Figure 12 is a partial sectional view of an oscillating valve constructed according to the invention.

Inasmuch as valves 24, 26, 27 of Figure 1 and valve 100 of Figure 11 may be identical, only valve 100 will be described in detail. The valve 100 comprises a hollow shaft 136 and an arcuate hollow valve member 137 including radially extending side walls 138 and 139 and arcuate top wall 140. A key 141 locks the hollow shaft 136 to the shaft 109 carrying gear 108. The receiving chute 142 has converging side walls 143 and 144 and parallel walls 145 and 146, Figure 13, defining opening 99. The side walls 138 and 139 of the valve 100 extend substantially to the converging side walls 143 and 144 so that material will not flow between the walls into the wrong funnel. Further the converging sidewalls serve to scrape off any material accumulated on the top wall 140 during the shifting of the valve. As indicated in dotted outline at 100a, the arcuate top entirely closes opening 99 before material is allowed to flow to the other funnel. This positive cut-off has value in making timing more precise, particularly where a plurality of valves are used as in Figure 1. Diverging side walls 147 and 148 of funnels 133 and 135 at their upper ends closely approach the hollow shaft 136. Referring to Figure 12, it will be seen that the hollow shaft 136 projects outwardly beyond the surfaces 138 and 147 as indicated at 149. Thus material flowing down along this valve face will be deflected outwardly away from the slight opening 150 to prevent material from escaping from the funnel. A similar projection of the hollow shaft with the valve in its left position, Figure 12, occurs in relation to the valve surface 139 as indicated in dotted outline at 139b.

Figures 13, 14, 15:
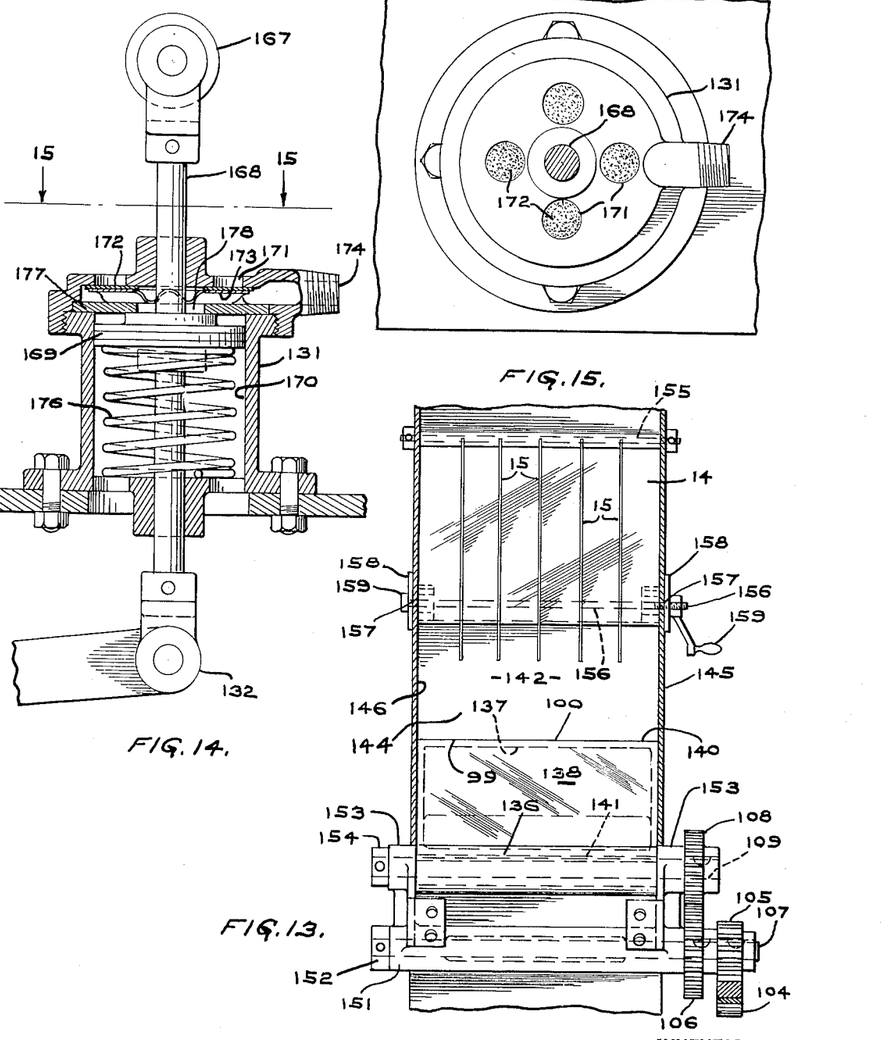
Figure 13 is a partial transverse sectional view of the guide and oscillating valve.
Figure 14 is an enlarged longitudinal sectional view of the follower mechanism of the preferred embodiment.
Figure 15 is an enlarged cross-sectional view taken along the lines 15—15 of Figure 14.

As can be seen in Figure 13, the shaft 107 is carried in an elongated journal 151, and secured therein by means of collar 152. Extending upwardly from journal 151, at each end, is a bearing member 153 carrying the shaft 109 secured thereon by means of collar 154.

As seen in Figure 13, a plurality of breakers 15 are disposed parallel to sides 145 and 146 of the receiving chute 142 and extend outwardly from the guide 14 toward the weighing conveyor 2. The breakers tend to maintain an even distribution of the material and minimize the undesirable effects of any air currents that might develop.

An upper shaft 155 carrying the guide 14 is journaled in the parallel walls 145, 146 of the receiving chute 142. A lower shaft 156 of guide 14 rides in arcuate slots 157 in the parallel walls and carries arcuate plates 158 without the walls in order to always close the slots 157. Clamp 159 clamps the guide at any desired angle for the purposes set forth above.

Figure 16:
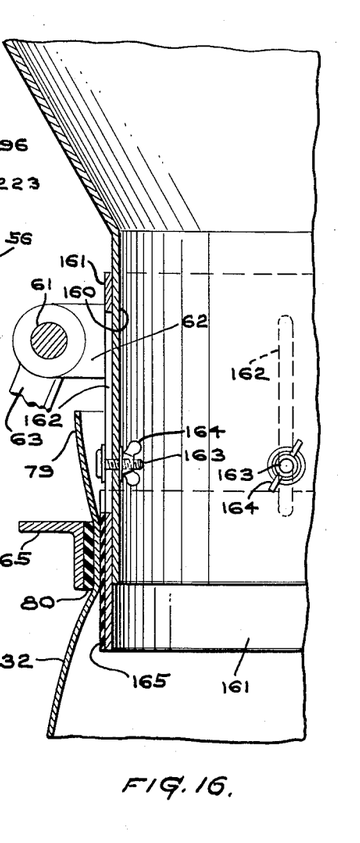
Figure 16 is a partial vertical sectional view of a bag mouth funnel and holding means.

With reference to Figure 16 which represents a typical bag mouth funnel for either of the two systems, reference numeral 160 designates the generally elliptical cross-section lower portion of the funnel. Sliding on this lower portion 160 on the outside is skirt 161 vertically adjustable to accommodate different length bags. From Figure 8, it will be seen that the entire holding means including cylinder 57 is shiftable vertically with skirt 161 to which brackets 62 carrying shafts 61 are attached since the flexible hose 71 allows free movement. The means for accomplishing the vertical adjustment of the skirt 161 are slots 162 therein in which ride bolts 163 having wing nuts 164 thereon. A rubber coating 165 is placed on the skirt 161 so that the bag top is gripped between rubber surfaces 80 and 165.

Figure 17:
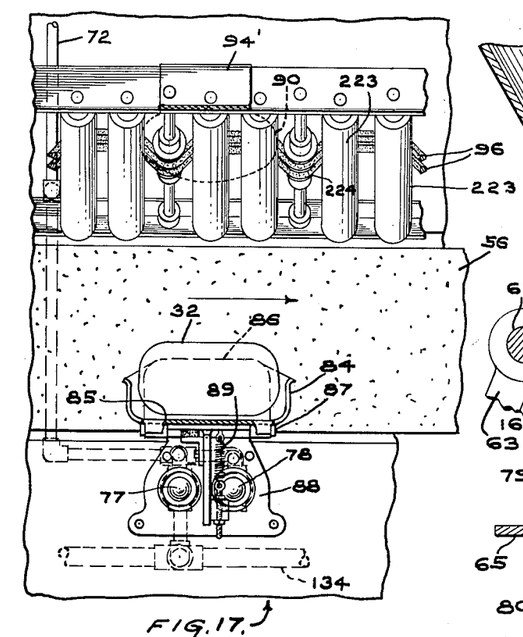
Figure 17 is a partial plan view of the conveyor and deflector.

The bag deflector 84 of the embodiment of Figure 17 is entirely similar to that shown in Figure 3 and need not again be described. The conveyor 94' of Figure 17 is similar to the curved part 94 of the inclined conveyor 55 and its parts have been designated with the same reference numerals. Conveyor 94' is slightly longer but may be driven by a single drive entirely similar to drive 91 of Figures 4 and 5. In Figure 17, the bag top closing shield has been omitted for clarity.

The follower mechanism 131 of Figure 11 is shown in detail in Figures 14 and 15 and comprises a roller 167 carried on one end of rod 168, a spring urged piston 169 at the other end of the rod riding in a cylinder 170. Inlet openings 171 in the top of the cylinder are closed by means of an annular element 172 held against the openings by means of spring 173. The exhaust outlet 174 is controlled by adjustable relief valve 175, Figure 11. The spring 176 urges the piston against an annular member 177, through the central opening 178 of which air flows from the inlet openings 171. The depression of the rod 168 by means of cam surface 130 causes the piston to travel downwardly, the vacuum created causing the unseating of element 172 to allow the inflow of air. When the rod is no longer urged downwardly, the piston gradually returns to its upper position as air is expelled from the cylinder through valve 175, the element 172 having returned to its seated position under action of spring 173. The piston is connected to the linkage 132 which operates the common relief valve 129 as previously described. Thus a delayed action is obtained in closing the common relief valve 129 which delay is adjustably controlled by the valve 175.

Figure 18:
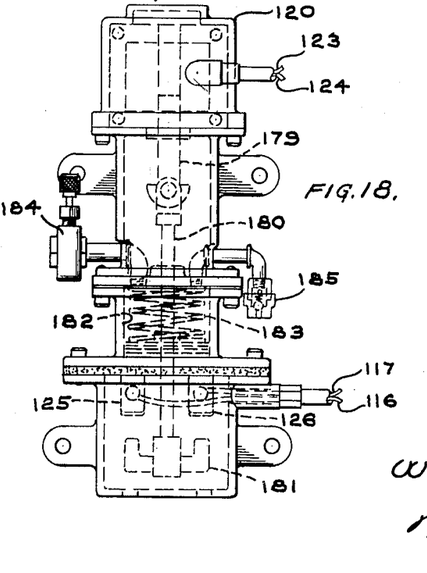
Figure 18 is an elevational view of the delayed action relay of the preferred embodiment.

The delayed action relay is shown in Figure 18. The connecting of the power supply across conductor 123 and 124 actuates a solenoid to draw up the armature 179 and arm 180 connected thereto. At the lower end of arm 180 is a U-shaped contact 181 for closing contacts 125, 126. A piston connected to arm 180 is also drawn upwardly in cylinder 182 against the action of a spring 183, air being gradually released through valve 184. A dashpot effect is thus created to delay the closing of contacts 125 and 126 to connect conductors 116 and 117.

Upon release of the solenoid, the contacts are immediately opened by the action of spring 183, one-way intake valve 185 allowing air to enter cylinder 182 freely.

The preferred and a modified form of the weighed quantity filling apparatus have thus been described, the description being specific and in detail in order that the manner of construction, applying, operating and using the invention may be fully understood. However, considerable variation in detail is contemplated within the scope of the invention, the specific terms being used descriptively rather than in a limiting sense, and the scope of the invention being defined in the claims.

What is claimed as new and is desired to be secured by Letters Patent is:

1. In a machine for filling successive receptacles with a weighed quantity of material, means for guiding material and means for supporting a plurality of receptacles simultaneously in feed relation to said guiding means, a continuously operating uniform weighing feed device for supplying a substantially uniform flow of weighed material to the guiding means to fill successive receptacles, means for periodically interrupting the flow of material from said guiding means to said receptacle, and simultaneously to direct it to another receptacle, means to coordinate the periodic interrupting means with the uniform weighing feed device including separate timing means to operate said flow interrupting and directing means for each receptacle the time of flow interruption determined by the timing means, being sufficient to replace a filled receptacle, and the time of flow non-interruption likewise determined by the timing means being just sufficient for the desired quantity of material to flow directly from the uniform weighing feed device past said flow-interrupting means said guiding means providing through ways to pass material from the continuous feed device to the receiving receptacles without accumulation thereof therebetween.

2. In a machine for filling successive bags with a weighed quantity of material, means for guiding material and means for supporting a plurality of bags simultaneously in a line in feed relation to said guiding means, a continuously operating uniform weighing feed device for supplying a substantially uniform flow of weighed material to the guiding means to fill successive bags, means for periodically interrupting the flow of material from said feed device to said guiding means, means to coordinate the periodic interrupting means with the uniform weighing feed device, the time of flow interruption determined by the coordinating means being sufficient to replace a filled bag, the time of flow non-interruption likewise determined by the coordinating means being just sufficient for the desired quantity of material to flow directly from the uniform weighing feed device past said flow-interrupting means, and means timed by the coordinating means for automatically releasing said bags, and an inclined conveyor adjacent the guiding means and spaced from the bag supporting means, and a deflector receiving the bags when released, said deflector tilting and moving the bag to said conveyor, whereby bags on the conveyor are displaced from those held by said supporting means to avoid interference therewith.

3. In a machine for filling successive receptacles with a weighed quantity of material, means for guiding material and means for supporting a receptacle in feed relation to said guiding means, a continuously operating substantially horizontal uniform weighing feed device for delivering a substantially uniform flow of weighed material to said guiding means from its substantially horizontal path of flow to fill successive receptacles, a guide adjacent the delivery end of said uniform feed device spaced therefrom above the path of flow of material therefrom and contacted on one side by the material to deflect material downwardly to said guiding means, said guide being adjustable for different delivery rates of said feed device, means for periodically interrupting the flow of material from said feed device to said guiding means, means to coordinate the periodic interrupting means with the uniform weighing feed device, the time of flow interruption determined by the coordinating means being sufficient to replace a filled receptacle, and the time of flow non-interruption likewise determined by the coordinating means being just sufficient for the desired quantity of material to flow past said flow-interrupting means said guiding means providing through ways to pass material from the continuous feed device to the receiving receptacle without accumulation thereof therebetween and said adjustable guide preventing sticking and bridging of the material in the guiding means.

4. In a machine for filling successive receptacles with a weighed quantity of material, means for guiding material and means for supporting a receptacle in feed relation to said guiding means, a continuously operating substantially horizontal uniform weighing feed device for delivering a substantially uniform flow of weighed material to the guiding means from its substantially horizontal path of flow to fill successive receptacles, a guide adjacent the delivery end of said uniform feed device spaced therefrom above the path of flow of material therefrom and contacted on one side by the material to deflect material downwardly to said guiding means, said guide being adjustable for different delivery rates of said feed device, means for periodically interrupting the flow of material from said feed device to said guiding means, means to coordinate the periodic interrupting means with the uniform weighing feed device, the time of flow interruption determined by the coordinating means being sufficient to replace a filled receptacle, the time of flow non-interruption likewise determined by the coordinating means being just sufficient for the desired quantity of material to flow past said flow-interrupting means, and said guide having a plurality of breakers extending toward the uniform feed device to maintain a uniform distribution of material said guiding means providing through ways to pass material from the continuous feed device to the receiving receptacle without accumulation thereof therebetween and said adjustable guide preventing sticking and bridging of the material in the guiding means.

5. In a machine for filling successive bags with a weighed quantity of material, means for guiding material and means for supporting a plurality of bags simultaneously in a line in feed relation to said guiding means, a continuously operating uniform weighing feed device for supplying a substantially uniform flow of weighed material to the guiding means to fill successive bags, means for periodically interrupting the flow of material from said feed device to said guiding means, means to coordinate the periodic interrupting means with the uniform weighing feed device, the time of flow interrupting determined by the coordinating means being sufficient to replace a filled bag, and the time of flow non-interruption likewise determined by the coordinating means being just sufficient for the desired quantity of material to flow past said flow-interrupting means, means to release said bags and to tilt them over and an inclined conveyor spaced from the bag supporting means receiving tilted filled bags from said bag supporting means and conveying them in a direction parallel with the line of bags, said conveyor being inclined away from said supporting means to avoid interference with bags held thereby.

6. In a machine for filling successive bags including bag mouth funnels and a plurality of means for simultaneously supporting bags in feed relation to said funnels, a continuously operating uniform weighing feed device for supplying a substantially uniform flow of weighed material to successive bag mouth funnels to fill successive bags, a valve for interrupting the flow to one bag mouth funnel from said feed device and for opening it to another, first means for moving said valve from flow-interrupting position to non-flow-interrupting position and second means for moving said valve from non-flow-interrupting position to flow-interrupting position, and timing means settable for preselected periods for alternately actuating said first and second means periodically, said timing means being coordinated with, but independent of the amount of material fed to the bag mouth funnel during non-interrupting position of said valve, said first means being actuated sufficiently long determined by the periods of the timing means after actuating said second means to replace a filled bag and said second means being actuated sufficiently long likewise determined by the periods of the timing means after actuation of said first means to have delivered the desired amount of material and no more to the bag mouth funnel from the continuously operating uniform flow feed device.

7. In a machine for filling successive bags including a pair of bag mouth funnels and means for simultaneously supporting bags in feed relation to said funnels, a continuously operating uniform weighing feed device for supplying a substantially uniform amount of weighed material to the funnels to fill successive bags, a valve for alternately guiding material into one funnel and then the other, first means for moving said valve to position to guide material into a first of said funnels, second means for moving said valve to position to guide material into the second of said funnels, and timing means settable for preselected periods for alternately actuating said first and second means periodically, said timing means being coordinated with, but independent of the amount of material fed to the bag mouth funnels, said first means being actuated sufficiently long determined by the periods of the timing means after actuation of said second means to allow replacement of a filled bag of the first funnel and filling to the desired amount of a bag on the second funnel and said second means being actuated sufficiently long likewise determined by the periods of the timing means after actuation of said first means to allow replacement of a filled bag on the second funnel and filling to the desired amount of a bag on the first funnel said funnels providing through ways to pass material from the continuous feed device to the bags without accumulation thereof therebetween.

8. In a machine for filling successive bags including a pair of bag mouth funnels and means for simultaneously supporting bags in feed relation to said funnels, a continuously operating uniform weighing feed device for supplying a substantially uniform amount of weighed material to the funnels to fill successive bags, an oscillating valve for alternately guiding material into one funnel then the other, an axis on which said valve is mounted to oscillate the same, a pinion on the shaft means including a reciprocating rack meshing with said pinion for oscillating said valve, a first solenoid for moving said rack to move said valve to guide material into a first of said funnels, a second solenoid for moving said rack to move said valve to guide material into the second of said funnels, and timing means settable for preselected periods for alternately actuating said first and second solenoids periodically.

9. In combination in a bag filling apparatus, a pair of bag mouth funnels and pneumatic means for holding a bag in feed relation to each of said funnels, a continuously operating uniform weighing feed device for supplying a substantially uniform amount of weighed material to the funnels, an oscillating valve for alternately guiding material into one funnel then the other, means including a reciprocating rack oscillating said valve, a first solenoid for moving said rack to move said valve to guide material into a first of said funnels, a second solenoid for moving said rack to move said valve to guide material into the second of said funnels, and timing means alternately actuating said first and second solenoids periodically, a common relief valve for each pneumatic holding means and a cam surface on said rack to open and close said common relief valve during movement of said rack under actuation of one of the solenoids, a valve between said common relief valve and each of said bag holding means, and means carried by said rack to open the valve associated with the second bag holder after the first solenoid is actuated to release the second bag holding means, means carried by said rack to open the valve associated with the first bag holding means after the second solenoid is actuated to release the first bag holding means.

10. The combination in a bag filling apparatus of a pair of bag mouth funnels and pneumatic means for holding a bag in feed relation to each of said funnels, a continuously operating uniform weighing feed device for supplying a substantially uniform amount of weighed material to the funnels, an oscillating valve for alternately guiding material into one funnel then the other, means including a reciprocating rack oscillating said valve, a first solenoid for moving said rack to move said valve to guide material into a first of said funnels, a second solenoid for moving said rack to move said valve to guide material into the second of said funnels, and timing means alternately actuating said first and second solenoids periodically, a common relief valve for the pneumatic holding means and a cam surface on said rack to open and close said common relief valve during movement of said rack under actuation of one of the solenoids, a control valve between said common relief valve and each of said bag holding means, and means carried by said rack to open the control valve associated with the second bag holder after the first solenoid is actuated to release the second bag holding means, means carried by said rack to open the control valve associated with the first bag holder after the second solenoid is actuated to release the first bag holder, an air supply for each pneumatice holding means, a valve in said air supply for controlling said holding means, and an auxiliary exhaust valve between said air supply valve and each said holding means for release of said holding means independently of said control and common relief valves.

11. The combination in a bag filling apparatus of a pair of bag mouth funnels and pneumatic means for holding a bag in feed relation to each of said funnels, a continuously operating uniform feed weighing device for supplying a substantially uniform amount of weighed material to the funnels, an oscillating valve for alternately guiding material into one funnel then the other, means including a reciprocating rack oscillating said valve, a first solenoid for moving said rack to move said valve to guide material into a first of said funnels, a second solenoid for moving said rack to move said valve to guide material into the second of said funnels, and timing means alternately actuating said first and second solenoids periodically, a common relief valve for the pneumatic holding means and a cam surface on said rack to open and close said common relief valve during movement of said rack under actuation of one of the solenoids, a control valve between said common relief valve and each of said bag holding means, and means carried by said rack to open the control valve associated with the second bag holder when the first solenoid is actuated to release the second bag holding means, means carried by said rack to open the control valve associated with the first bag holder when the first solenoid is actuated to release the first bag holding means, an air supply for each pneumatic holding means, a valve in said air supply for controlling said holding means, and an auxiliary exhaust valve between said air supply valve and said bag holding means for release of said holding means independently of said control and common relief valves and an inclined conveyor adjacent said bag holding means moving in the direction of the line of bag holders, a deflector for said bags when filled and released from said holding means, said deflector automatically displacing said bags from the line of said holding means against said inclined conveyor to clear bags being filled without intervention of an operator.

12. A weighed quantity bag filling apparatus comprising a continuously operating uniform weighing feed device for delivering material to fill successive bags, a plurality of bag mouth distending and holding devices for simultaneously supporting bags to be filled from said uniform feed device, means for guiding material from said feed device to said distending and holding devices, means for successively directing material to each of said distending and holding devices along the guiding means thereto, means for releasing said bags from said holding devices, means for synchronizing the release means with said directing means to release bags after they are filled said guiding means providing through ways to pass material from the continuous feed device to the bags without accumulation thereof therebetween.

13. A weighed quantity bag filling apparatus comprising a continuously operating substantially horizontal uniform weighing feed device for delivering material freely from the substantially horizontal path of flow to fill successive bags, bag mouth distending and holding devices for simultaneously supporting bags to be filled from said uniform feed device, means for guiding material from said feed device to said distending and holding devices, means for successively directing material to each of said distending and holding devices along the guiding means thereto, means for releasing said bags from said holding devices, means for synchronizing the release means with said directing means to release bags after they are filled and a guide at an acute angle to the line of flow of material from said feed device deflecting material to said guiding means said guiding means providing through ways to pass material from the continuous feed device to the bags without accumulation thereof therebetween and said guide preventing sticking and bridging of the material in the guiding means.

14. A weighed quantity bag filling apparatus comprising a substantially horizontal uniform weighing feed device for delivering a uniform weight of material per unit time freely from the substantially horizontal path of flow to fill successive bags, a chute for guiding material from the feed device and having an opening below through which the material passes, a pair of funnels adjacent and below the chute opening for receiving material from said opening, means for simultaneously supporting a plurality of bags to receive material from said funnels, valve means beneath the chute opening, means periodically operating said valve means to alternately direct material to the respective funnels, a weighed quantity of material flowing to each funnel each time the valve means directs material to the funnel to fill a bag supported to receive material from the funnel, the filled bags being replaced while the valve means directs flow to the other funnel and a guide for deflecting material flowing from said feed device and spaced therefrom above the path of flow of material therefrom and contacted on one side by the material, downwardly directly toward said chute opening said chute and funnels providing through ways to pass material from the continuous feed device to the bags without accumulation thereof therebetween and said guide preventing sticking and bridging of the material in the chute and funnels.

15. A weighed quantity bag filling apparatus comprising a substantially horizontal uniform weighing feed device for delivering a uniform weight of material per unit time freely from the substantially horizontal path of flow to fill successive bags, a chute for guiding material from the feed device and having an opening below through which the material passes, a pair of funnels adjacent and below the chute opening for receiving material from said opening, means for simultaneously supporting a plurality of bags to receive material from said funnels, valve means beneath the chute opening, means periodically operating said valve means to alternately direct material to the respective funnels, a weighed quantity of material flowing to each funnel each time the valve means directs material to the funnel to fill a bag supported to receive material from the funnel, the filled bags being replaced while the valve means directs flow to the other funnel, and a guide for deflecting material flowing from said feed device and spaced therefrom above the path of flow of material therefrom and contacted on one side by the material, downwardly directly toward said chute opening, said guide having breakers to insure uniform distribution of material flowing from said guide said chute and funnels providing through ways to pass material from the continuous feed device to the bags without accumulation thereof therebetween and said guide preventing sticking and bridging of the material in the chute and funnels.

16. In a weighed quantity bag filling apparatus wherein a uniform weighing feed device supplies material at a constant rate to fill successive bags and a plurality of funnels are disposed to successively receive material from said uniform feed device and means are provided for supporting receptacles in feed relation to the funnels, a receiving chute into which material is fed by the uniform feed device having sides defining a discharge opening, walls converging beneath said opening and spaced therefrom, a valve mounted between said converging walls and having upwardly diverging walls spaced to span the discharge opening and adapted to span the spacing between said receiving chute walls and said converging walls to block the flow of material along one of said converging walls and guide material along the other, said valve including a rounded lower portion contiguous with the converging walls and protruding beyond the valve walls so that material flowing along a valve wall is deflected outwardly to avoid leakage of material between the valve and the converging walls, the valve cutting off the flow of material along one converging wall before the beginning of flow along the other.

17. In a weighed quantity bag filling apparatus in which a uniform weighing feed device supplies material at a constant rate to fill successive bags and a plurality of bag distending devices are disposed to successively receive material from said uniform feed device, means to hold said bags upon said bag distending devices and to automatically release the bags as they become filled, said holding means comprising a pair of jaws pivotally mounted on said bag distending device, substantially parallel axes mounting said jaws and arms connected to said axes at one side of said device and connecting with said axes and pivoted to open and close said jaws, and an air cylinder and piston carried by and extending between said arms to open and close the jaws.

18. In a weighed quantity bag filling apparatus in which a uniform weighing feed device supplies material at a constant rate to fill successive bags and a plurality of bag distending devices are disposed to successively receive material from said uniform feed device, means to hold said bags upon said bag distending devices and to automatically release the bags as they become filled, said holding means comprising a pair of jaws pivotally mounted on said bag distending device, substantially parallel axes mounting said jaws and arms connected to said axes at one side of said device and connecting with said axes and pivoted to open and close said jaws, and an air cylinder and piston carried by and extending between said arms to open and close the jaws, timing means controlling said release means, and means for opening and closing said jaws independently of said timing means to facilitate replacement of bags on the bag distending devices.

19. In a weighed quantity bag filling apparatus in which a uniform weighing feed device supplies material at a constant rate and a plurality of bag distending devices are disposed to successively receive material from said uniform feed device, means to hold said bags upon said bag distending devices and to automatically release the bags as they become filled, said holding means comprising a pair of jaws pivotally mounted on said bag distending device, substantially parallel axes mounting said jaws and arms connected to said axes at one side of said device and connecting with said axes and pivoted to open and close said jaws, and an air cylinder and piston carried by and extending between said arms to open and close the jaws and interconnecting arms connecting with said jaws to constrain them to release uniformly.

20. A bag holder and distender comprising means for distending the bag, a pair of jaws pivotally mounted on said distending means, substantially parallel axes mounting said jaws and a pair of arms connected to said axes at one side of said bag distending means controlling the pivotal motion of said jaws, a cylinder supported at one end on one of said arms, a piston in the other end of the cylinder connected with the other of said arms, the expansion of said piston and cylinder clamping the jaws against a bag on the bag distending means.

21. A bag holder and distender comprising means for distending the bag, a pair of jaws pivotally mounted on said distending means, substantially parallel axes mounting said jaws and a pair of arms connected to said axes at one side of said bag distending means controlling the pivotal motion of said jaws, a cylinder supported at one end by one of said arms, a piston in the other end of the cylinder connected with the other of said arms, the expansion of said piston and cylinder clamping the jaws against the bag distending means, soft rubber pads adjacent the distending means engaging portion of said jaws to close the top edge portions of the bag not pressed by said jaws against said bag distending means.

22. A bag holder and distender comprising means for distending a bag, a pair of jaws pivotally mounted on said distending means, substantially parallel axes mounting said jaws and a pair of arms connected to said axes at one side of said bag distending means controlling the pivotal motion of said jaws, a cylinder supported at one end by one of said arms, a piston in the other end of the cylinder connected with the other of said arms, the expansion of said piston and cylinder clamping the jaws against the bag distending means, connecting links between said axes to coordinate and equalize the opening and closing movements of the jaws.

23. In a machine for filling successive bags with weighed quantities of material, means to support a plurality of bags simultaneously in bag filling position in a row, conveyors adjacent and parallel to the row of bag supporting means, means to release filled bags from said supporting means and means to receive the released bags and move them to said conveyors and out of the path of other filling positioned bags between the released bag and the carrying away conveyors, whereby the released bag passes on the conveyors the filling positioned bags.

24. In a machine for filling successive bags with weighed quantities of material, means to support a plurality of bags simultaneously in bag filling position in a row, a first substantially horizontal conveyor adjacent and parallel to the row of bag supporting means, a second conveyor adjacent said first conveyor obtusely angularly positioned relatively thereto, means to release filled bags from said supporting means, and means to receive the released bags and tilt them to said conveyors and out of the path of other filling positioned bags, a portion of the path of travel of the angularly positoined conveyor beyond the filling positioned bags having a smaller angle with respect to the first conveyor to turn the bags to substantially upright position on the first conveyor.

References Cited in the file of this patent

UNITED STATES PATENTS

| Number | Name | Date |
|---|---|---|
| 215,502 | Bikle | May 20, 1879 |
| 414,725 | Rose | Nov. 12, 1889 |
| 448,238 | Johnson | Mar. 17, 1891 |
| 513,700 | Anderson | Jan. 30, 1894 |
| 789,085 | Dary | May 2, 1905 |
| 797,764 | Webb | Aug. 22, 1905 |
| 1,290,405 | Suter | Jan. 7, 1919 |
| 1,325,602 | Albright | Dec. 23, 1919 |
| 1,336,612 | Callahan | Apr. 13, 1920 |
| 1,667,930 | Edmunds | May 1, 1928 |
| 1,849,256 | Trovaton | Mar. 15, 1932 |
| 2,070,152 | Bennet | Feb. 9, 1937 |
| 2,235,942 | Moore | Mar. 25, 1941 |
| 2,273,330 | Robinson | Feb. 17, 1942 |
| 2,327,282 | McComb | Aug. 17, 1943 |
| 2,333,232 | Bleam et al. | Nov. 2, 1943 |
| 2,376,810 | Richardson | May 22, 1945 |
| 2,472,459 | Banks | June 7, 1949 |
| 2,542,133 | Gorby | Feb. 20, 1951 |

FOREIGN PATENTS

| Number | Country | Date |
|---|---|---|
| 344,205 | Germany | Nov. 17, 1921 |